(12) United States Patent
Willats et al.

(10) Patent No.: US 10,823,032 B2
(45) Date of Patent: Nov. 3, 2020

(54) MIXER SYSTEM PROXIMATE TO VEHICLE ENGINE

(71) Applicant: Faurecia Emissions Control Technologies, USA, LLC, Columbus, IN (US)

(72) Inventors: Robin H. Willats, Columbus, IN (US); Adam Mathews, Lebanon, OH (US); John Rohde, Columbus, IN (US); Alfred N. Tucker, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 19 days.

(21) Appl. No.: 16/176,574

(22) Filed: Oct. 31, 2018

(65) Prior Publication Data
US 2019/0128167 A1 May 2, 2019

Related U.S. Application Data

(60) Provisional application No. 62/580,194, filed on Nov. 1, 2017.

(51) Int. Cl.
*F01N 3/20* (2006.01)
*F01N 3/035* (2006.01)
(Continued)

(52) U.S. Cl.
CPC .......... *F01N 3/2066* (2013.01); *F01N 3/035* (2013.01); *F01N 3/2821* (2013.01); *F01N 3/021* (2013.01); *F01N 3/108* (2013.01); *F01N 13/009* (2014.06); *F01N 13/0093* (2014.06); *F01N 2250/02* (2013.01); *F01N 2330/22* (2013.01); *F01N 2340/02* (2013.01); *F01N 2470/08* (2013.01);
(Continued)

(58) Field of Classification Search
CPC .......... F01N 3/021; F01N 3/035; F01N 3/108; F01N 3/2066; F01N 3/2821; F01N 13/009; F01N 13/0093; F01N 2250/02; F01N 2330/22; F01N 2340/02; F01N 2470/08; F01N 2470/10; F01N 2470/24; F01N 2570/14; F01N 2590/08; F01N 2610/02; F01N 2610/1453
See application file for complete search history.

(56) References Cited

U.S. PATENT DOCUMENTS

| 2015/0165377 A1* | 6/2015 | Schroeder | .......... B01D 53/9477 422/119 |
| 2017/0009638 A1* | 1/2017 | Suetou | .................. F01N 3/2066 |

(Continued)

FOREIGN PATENT DOCUMENTS

CN       205190011 U  *  4/2016

*Primary Examiner* — Audrey K Bradley
(74) *Attorney, Agent, or Firm* — Barnes & Thornburg LLP (57) ABSTRACT

An automotive vehicle includes an exhaust aftertreatment system. The exhaust aftertreatment system includes a mixer, a doser that injects a reducing agent into the mixer, and a selective catalytic reduction unit. The exhaust aftertreatment system mixes exhaust gases and the reducing agent for treatment prior to the exhaust gases being discharged into the atmosphere. Some components of the exhaust aftertreatment system are positioned proximate to an associated combustion engine to minimize thermal energy loss from the exhaust gases prior to interaction with the exhaust aftertreatment system.

20 Claims, 7 Drawing Sheets

(51) Int. Cl.
*F01N 3/28* (2006.01)
*F01N 3/10* (2006.01)
*F01N 3/021* (2006.01)
*F01N 13/00* (2010.01)

(52) U.S. Cl.
CPC ...... *F01N 2470/10* (2013.01); *F01N 2470/24* (2013.01); *F01N 2570/14* (2013.01); *F01N 2590/08* (2013.01); *F01N 2610/02* (2013.01); *F01N 2610/1453* (2013.01)

(56) References Cited

U.S. PATENT DOCUMENTS

2017/0051472 A1* 2/2017 Mochimaru .............. E02F 9/18
2018/0133650 A1* 5/2018 Usui ................... F01N 3/2853

* cited by examiner

MIXER SYSTEM PROXIMATE TO VEHICLE ENGINE

PRIORITY

This application claims priority under 35 U.S.C. § 119(e) to U.S. Provisional Application Ser. No. 62/580,194, filed Nov. 1, 2017, which is expressly incorporated by reference herein.

BACKGROUND

The present disclosure relates to exhaust aftertreatment systems for automotive applications, and particularly to a system for reducing nitrogen oxides and other effluents in exhaust gases from a combustion engine.

SUMMARY

A vehicle, in accordance with the present disclosure, includes a combustion engine and an exhaust aftertreatment system. The engine produces exhaust gases during operation and is coupled to the aftertreatment system via an exhaust passageway. The aftertreatment system is configured to treat the exhaust gases and reduce effluents, such as nitrogen oxides (NOx), in the exhaust gases before it is released into the atmosphere.

In illustrative embodiments, the aftertreatment system includes a close-coupled NOx reduction unit coupled proximate to the combustion engine and a remote gas treatment unit positioned downstream of the close-coupled NOx reduction unit. The close-coupled NOx reduction unit is located in an engine compartment of the vehicle along with the engine. The proximity of the close-coupled NOx reduction unit to the combustion engine minimizes thermal energy losses during cold start operation of the combustion engine.

In illustrative embodiments, the close-coupled NOx reduction unit includes a mixer fluidly coupled to an exhaust outlet of the combustion engine, a doser configured to inject a reducing agent into the exhaust gases, and a selective catalytic reduction unit (SCR) positioned downstream of the mixer and doser. The mixer is configured to receive the hot exhaust gases directly from the engine and mix the gases with the reducing agent. The SCR has a catalyst positioned downstream of the mixer that encourages chemical reaction between the exhaust gases and the reducing agent so as to reduce NOx in the exhaust gases.

In illustrative embodiments, the remote gas treatment unit may include a plurality of additional exhaust gas treatment devices such as a diesel oxidation catalyst (DOC), a diesel particulate filter (DPF), and/or a secondary NOx reduction unit. The secondary NOx reduction unit can include at least one secondary doser and at least one secondary selective catalytic reduction unit (SCR).

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 4A-4D are a series of diagrammatic views of a flowpath assembly included in the selective catalytic reduction unit of FIG. 3 showing that flowpath channels defined by the flowpath assembly can have a variety of cross sectional shapes and arrangements;

FIGS. 5A-5D are a series of diagrammatic views of similar flowpath assemblies to FIGS. 4A-4D showing that a plurality of flowpath channels defined by the flowpath assemblies can be enclosed in a housing;

DETAILED DESCRIPTION

For the purposes of promoting an understanding of the principles of the disclosure, reference will now be made to a number of illustrative embodiments illustrated in the drawings and specific language will be used to describe the same.

Figure 1A:
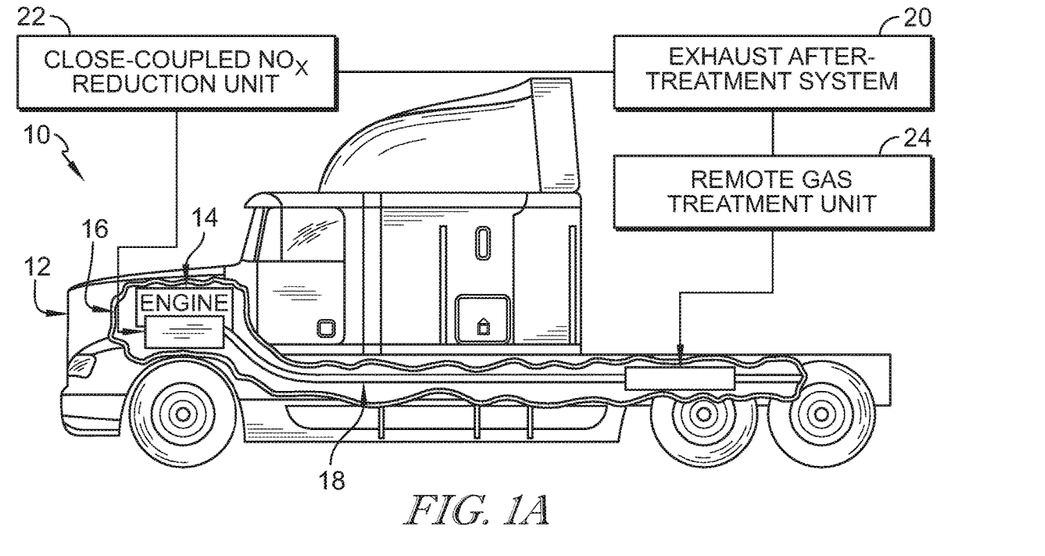
FIG. 1A is a side elevation and diagrammatic view of an over the road vehicle with portions of a vehicle body cut away to expose an engine compartment diagrammatically showing a combustion engine located in the engine compartment along with a close-coupled $NO_x$ reduction unit that is used as part of an engine exhaust system to treat exhaust gases produced by the combustion engine.

A vehicle 10, in accordance with the present disclosure, is shown in FIG. 1. The vehicle 10 is illustratively embodied as an over the road vehicle 10 or semi-truck 10. The vehicle 10 includes a vehicle body 12 and a combustion engine 14. The vehicle body 12 defines an engine compartment 16 in which the combustion engine 14 lies. The combustion engine 14 produces exhaust gases that are directed though an exhaust passageway 18 and expelled into the atmosphere during operation of the combustion engine 14.

The vehicle 10 further includes an exhaust aftertreatment system 20 positioned along the exhaust passageway 18 in fluid commination with the combustion engine 14 as shown in FIG. 1A. The exhaust aftertreatment system 20 is configured to treat the exhaust gases and reduce effluents including nitrous oxides (NOx) prior to the exhaust gases being expelled into the atmosphere. In the illustrative embodiment, the exhaust treatment system 20 includes a close-coupled NOx reduction unit 22 positioned proximate to the combustion engine 12 to increase thermal energy transferred to the close-coupled NOx reduction unit 22 from and to potentially reduce noise. The close-coupled NOx reduction unit 22 is located in the engine compartment 16 and a remote gas treatment unit 24 arranged downstream of the combustion engine 14

Figure 1B:
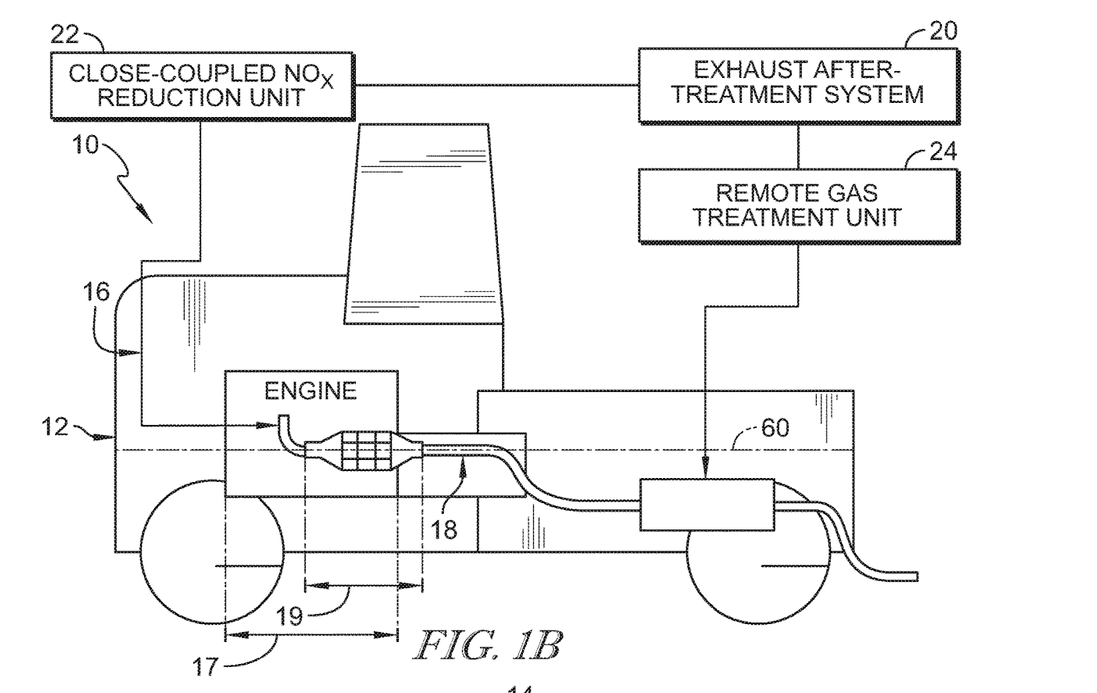
FIG. 1B is a front elevation of the vehicle of FIG. 1A with portions of the vehicle body cut away to show the engine and the close-coupled NOx reduction unit coupled to the engine and located in the engine compartment to increase energy transferred to the reduction unit during cold start operation of the engine.
Figure 2A:
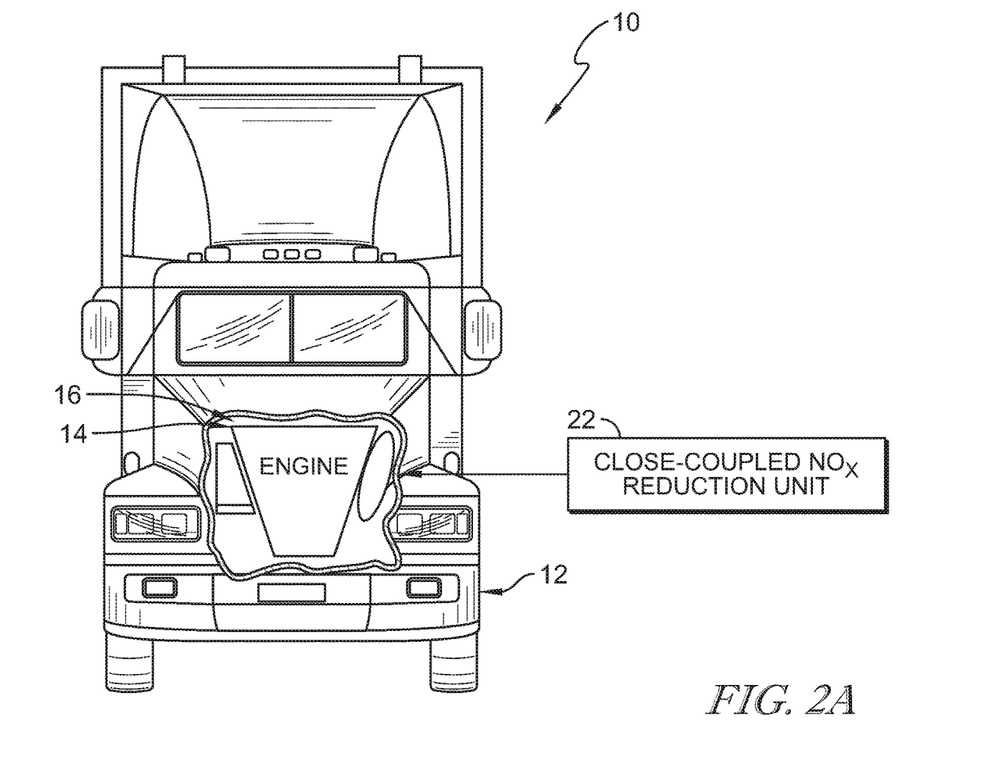
FIG. 2A is a diagrammatic view of the vehicle of FIG. 1A showing that the close-coupled NOx reduction unit axially overlaps the combustion engine along a lengthwise axis of the vehicle and is arranged within a footprint of the combustion engine when viewed from the side.
Figure 2B:
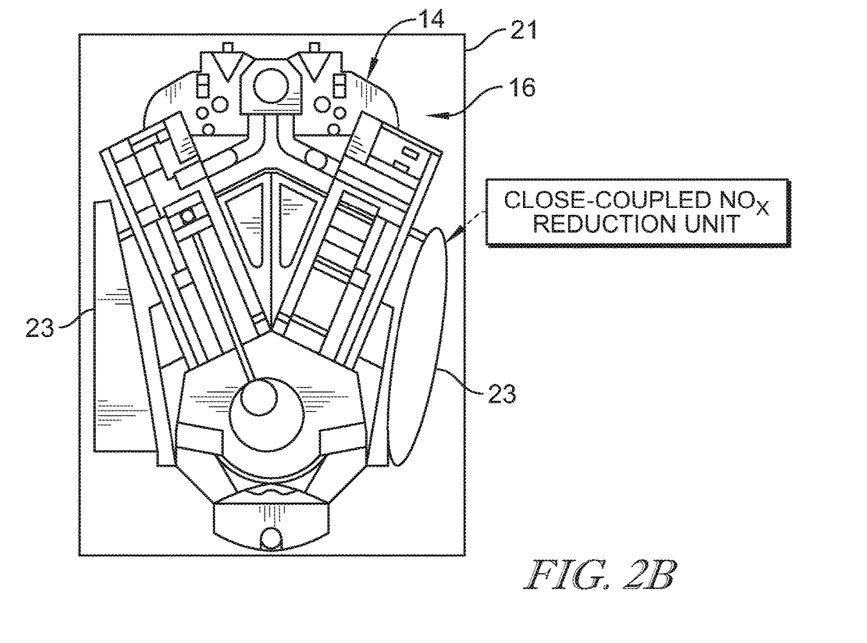
FIG. 2B is a front elevation view of the engine compartment of FIGS. 1A-2A showing gaps around the combustion engine and the close-coupled NOx reduction unit positioned in the gaps on either side of the combustion engine.

The vehicle body 12 includes an enclosure 21 that is shaped to define the engine compartment 16 and house the combustion engine 14 along with the close-coupled NOx reduction unit 22 as shown diagrammatically in FIGS. 1B and 2B. Depending on the type of combustion engine 14 located in the engine compartment 16 and available packaging space, differently sized spaces 23 may be formed between the combustion engine 14 and the enclosure 21. The close-coupled NOx reduction unit 22 includes a variety of features to provide means for fitting in the spaces 23 provided between the combustion engine 14 and the enclosure 21. In this way, the close-coupled NOx reduction unit 22 is positioned proximate to the engine 14 to minimize thermal energy loss from the exhaust gases prior to the exhaust gases and the reducing agent reacting chemically with the SCR catalyst.

In some embodiments of the disclosure, a portion or all of a length 19 of the close-coupled NOx reduction unit 22 is located in a footprint 17 of the combustion engine 14 as shown in FIG. 1B. In the illustrative embodiment, the close-coupled NOx reduction unit 22 is arranged to axially overlap the combustion engine 14 along a lengthwise axis 60 of the vehicle 10. The lengthwise axis 60 extends from a front of the vehicle 10 to a rear of the vehicle 10. The primary direction of exhaust gas flow is parallel to the lengthwise axis 60 of the vehicle 10.

The remote gas treatment unit 24 is coupled to the vehicle body and is fluidly downstream of the close-coupled NOx reduction unit 20 as shown in FIGS. 1A and 1B. In the illustrative embodiment, the remote gas treatment unit 24 is coupled to a vehicle chassis adjacent to rear wheels of the vehicle 10. However, in other embodiments, the remote gas treatment unit 24 may be coupled to the vehicle 10 below a cabin of the vehicle and may be arranged to lie behind steps leading into the cabin. In other embodiments, the remote gas treatment unit 24 may be located in any suitable location on the vehicle 10.

Figure 3:
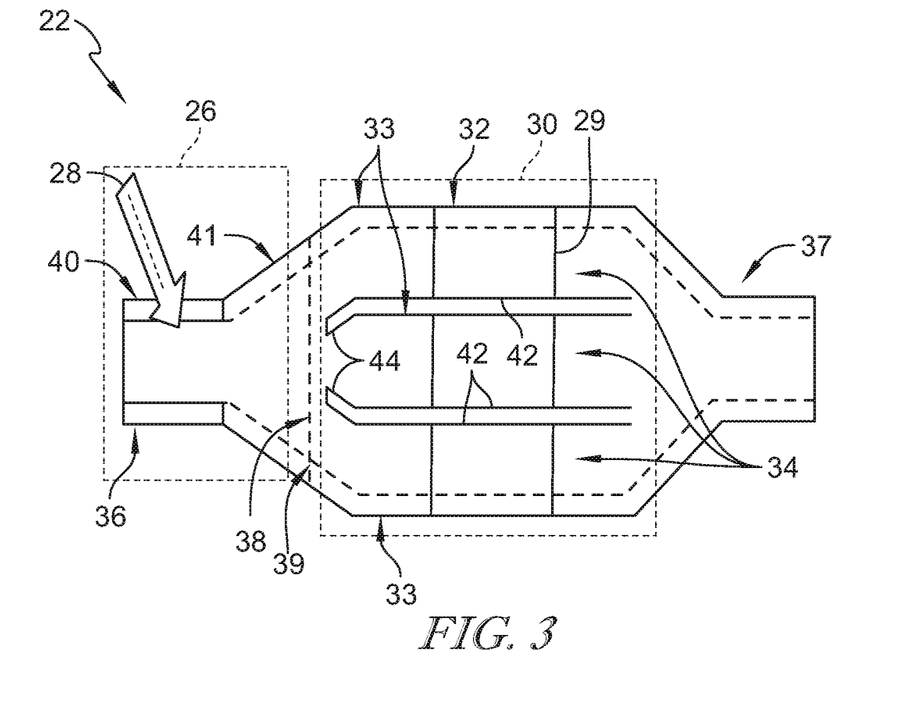
FIG. 3 is a diagrammatic view of the close-coupled NOx reduction unit from FIGS. 1A and 2A showing that the reduction unit includes a mixer arranged to receive exhaust gases from the combustion engine, a doser configured to inject a reducing agent into the mixer, and a selective catalytic reduction unit housing a catalyst.

The mixer 26 is positioned upstream of the SCR 30 and may include one or more baffle or structures that are configured to induce a swirl or turbulence in the exhaust gases to mix the exhaust gases and the reducing agent. Some examples of mixers that may be used in the close-coupled NOx reduction unit 22 are shown and described in U.S. Patent Pub. No. 2012/0216513, U.S. Patent Pub. No. 2016/0319720, and U.S. Pat. No. 9,719,397, each of which are expressly incorporated herein in their entirety.

The doser 28 may inject an aqueous reducing agent into the mixer 26, such as, for example, diesel exhaust fluid (DEF) or ammonium carbonate solution. In other embodiments the doser 28 may inject gaseous ammonia into the mixer 26. In one embodiment, the reducing agent is stored in a tank located on the vehicle body. In other embodiments, an onboard ammonia gas generation system such as an Ammonia Storage and Distribution System (ASDS) may be used to produce ammonia gas for use in the close-coupled NOx reduction unit 22 or other aftertreatment devices included in the exhaust aftertreatment system 20. The doser 28 may be connected to a controller to control the amount of reducing agent injected into the mixer 26.

The SCR 30 includes at least one SCR catalyst 29 and a flowpath assembly 32 that defines a plurality of flowpath channels 34 in which the at least one catalyst 29 is mounted as shown in FIG. 3. In the illustrative embodiment, the SCR catalyst 29 may comprise a plate type structure, a honeycomb structure, a corrugated structure or any other suitable catalyst structure. The plurality of flowpath channels 34 are shaped to minimize backpressure in the exhaust passageway 18. For example, the flowpath assembly 32 may have a larger diameter than the exhaust passageway 18 to allow a greater flowrate of exhaust gases to flow therethrough.

In the illustrative embodiment, the flowpath assembly 32 includes at least one flowpath tube 33, an inlet 36 fluidly coupled to the plurality of flowpath channels 34, and an outlet 37 as shown in FIG. 3. In the illustrative embodiment, the inlet 36 is coupled directly to the combustion engine 14 to minimize energy loss from in the exhaust gases during cold start operation of the engine 10. The inlet 36 may be coupled directly to an exhaust outlet of the engine or may be coupled to directly to an exhaust outlet of a turbocharger if a turbocharger is included in the engine 10.

In some embodiments, the flowpath assembly 32 further includes a restrictor plate 38 positioned downstream of the inlet 36 as shown in FIG. 3. The restrictor plate 38 spans across the entire cross section of the inlet 36 and is formed to include a plurality of openings 39 to permit exhaust gases to flow therethrough. The restrictor plate 38 is configured to distribute the exhaust gases and the reducing agent evenly across a face of the SCR 30 with respect to velocity and concentration of the reducing agent. In other embodiments, the restrictor plate may be one or more baffle plates, one or more flow directing surfaces, extensions of the interior walls of the flowpath assembly, or any combination thereof.

The inlet 36 further include an inlet pipe 40 leading into the mixer 26 and an inlet cone 41 that extends from the pipe 40 to the plurality of flowpath channels 34 as shown in FIG. 3. The inlet pipe 40 may optionally include an insulating layer or may include an air gap pipe to provide insulation using the fluid in the air gap pipe. The insulating layer may comprise a metallic foam, ceramic materials, or any other suitable material with insulating properties. The air gap pipe may be filled with air or any other suitable fluid with insulating properties. In some embodiments, the insulating layer or air gap pipe may extend along the entire length 19 of the flowpath assembly.

In the illustrative embodiment, the flowpath assembly 32 includes three flowpath tubes 33 defining respective flowpath channels 34 as shown in FIG. 3. However, in other embodiments, any suitable number of flowpath tubes 33 may be used. Each individual flowpath channel 34 is arranged to receive a respective SCR catalyst therein. The flowpath tubes 33 and channels 34 may extend in any direction downstream of the mixer 26 in order to fit in an available space 23. Additionally, any part of the flowpath assembly may comprise metallic foam, with or without specially designed voids.

The flowpath channels 34 are separated from one another by respective flowpath channel walls 42 as shown in FIG. 3. Leading ends 44 of the walls 42 may be oriented to increase or decrease flow into each respective flowpath channel 34. In some embodiments, the leading ends 44 are oriented such that they cooperate with the inlet cone 41 to allow even flowrates of the exhaust gases to enter each respective flowpath channel 34. In other embodiments, the leading ends 44 may be oriented to permit uneven flow rates of the exhaust gases to enter the flowpath channels 34. In yet another example, the leading ends 44 may be coupled to an actuator to vary the flowrates of the exhaust gases entering the flowpath channels 34 or block flow into one or more of the channels 34 during operation of the engine 14.

The plurality of channels 34 may have a variety of different cross sectional shapes and arrangements as shown in FIGS. 4A-5D. The cross sectional shape and arrangement of the plurality of channels depends on the size of the space 23 between the enclosure 21 and the engine 14 in which the close-coupled NOx reduction unit 22 is located. The size and shape of the flowpath assembly also depends on the type of combustion engine included in the vehicle 10 and/or the types of features included in the engine 14 that affect the size of the spaces 23.

Figure 4A:
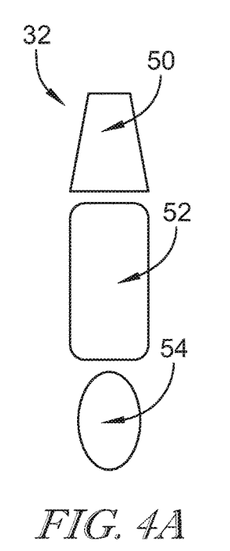
FIG. 4A is a diagrammatic view of a first embodiment of a flowpath assembly including a first tube with a polygonal cross section shape, a second tube with a rectangular cross section shape, and a third tube with an oval cross sectional shape.

A first embodiment of a flowpath assembly 32 is shown in FIG. 4A. The flowpath assembly 32 defines a first flowpath channel 50, a second flowpath channel 52, and a third flowpath channel 54. The flowpath channels 50, 52, and 54 are generally co-linear relative to one another. The first flowpath channel 50 includes a polygonal cross sectional shape. The second flowpath channel 52 includes a generally rectangular cross sectional shape. The third flowpath channel 54 includes an oval cross sectional shape. Although the channels 50, 52, 54 are illustratively shown having specific cross sectional shapes, any suitable cross sectional shape may be used.

Figure 5A:
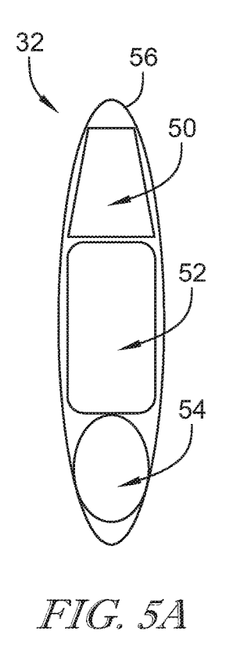
FIG. 5A is a diagrammatic view of a fifth embodiment of a flowpath assembly similar to FIG. 4A including a housing defining an interior space and a first tube with a polygon cross section shape, a second tube with a rectangular cross section shape and a third tube with a oval cross sectional shape contained in the interior space.

The flowpath assembly 32 may further include an enclosure 56 as shown in FIG. 5A. The enclosure 56 is formed around all flowpath tubes defining each of the flowpath channels 50, 52, 54. In other embodiments, the enclosure 56 may be formed around less than all of the flowpath tubes. In yet another embodiment, multiple enclosures may be formed around one or more subsets of the flowpath tubes. The enclosure 56 may be formed by hydroforming, mounting of fixing pieces together, wrapping the channels 34 or any other suitable method or system to provide the enclosure 56.

Figure 4B:
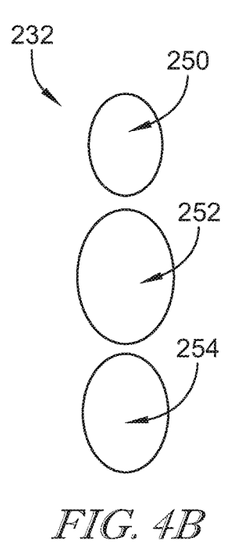
FIG. 4B is a diagrammatic view of a second embodiment of a flowpath assembly including a plurality of tubes each having an oval cross sectional shape.

A second embodiment of a flowpath assembly 232 is shown in FIG. 4B. The flowpath assembly 232 defines a first flowpath channel 250, a second flowpath channel 252, and a third flowpath channel 254. The flowpath channels 250, 252, and 254 are co-linear relative to one another and each include an oval cross sectional shape. Additionally, each of the flowpath channels have a generally equal area.

Figure 5B:
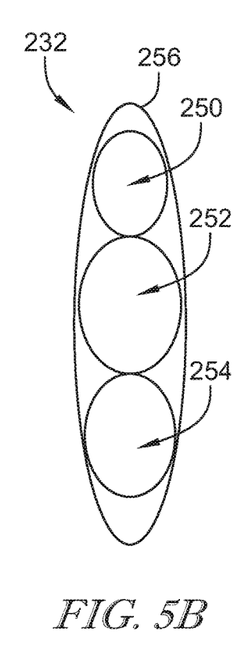
FIG. 5B is a diagrammatic view of a sixth embodiment of a flowpath assembly similar to FIG. 4B including a housing defining an interior space and a plurality of tubes each having a oval cross sectional shape contained in the interior space.

The flowpath assembly 232 may further include an enclosure 256 as shown in FIG. 5B. The enclosure 256 is formed around all flowpath tubes defining each of the flowpath channels 250, 252, 254. In other embodiments, the enclosure 256 may be formed around less than all of the flowpath tubes. In yet another embodiment, multiple enclosures may be formed around one or more subsets of the flowpath tubes. The enclosure 256 may be formed by hydroforming, mounting of fixing pieces together, wrapping the channels 34 or any other suitable method or system to provide the enclosure 256.

Figure 4C:
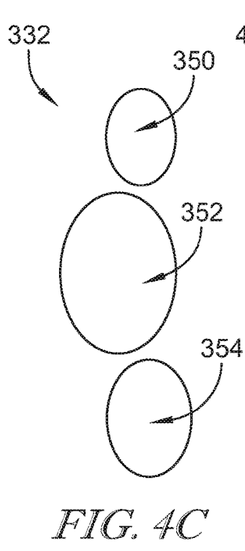
FIG. 4C is a diagrammatic view of a third embodiment of a flowpath assembly including a first tube with an oval cross sectional shape, a second tube offset from the first tube having an oval cross sectional shape larger than the first tube, and a third tube generally aligned with the first tube having an oval cross sectional shape about equal to the first tube.

A third embodiment of a flowpath assembly 332 similar to flowpath assembly 232 is shown in FIG. 4C. The flowpath assembly 332 defines a first flowpath channel 350, a second flowpath channel 352, and a third flowpath channel 354. The flowpath channels 350, 352, and 354 each include an oval cross sectional shape. The second flowpath channel 352 is offset from the first and third flowpath channels 350, 354 and has a greater area than the first and third flowpath channels 350, 354. In other embodiments at least one of the first and third flowpath channels 350, 354 may be offset from the other channels and may include larger or smaller area than the other channels.

Figure 5C:
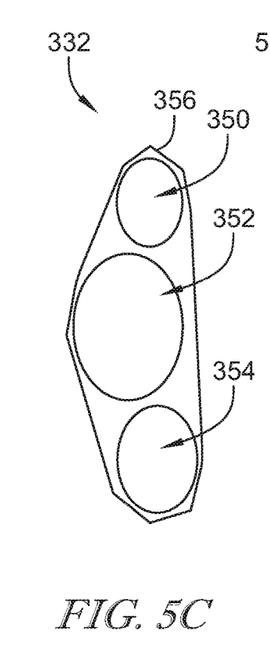
FIG. 5C is a diagrammatic view of a seventh embodiment of a flowpath assembly similar to FIG. 4C including a housing defining an interior space and a first tube with an oval cross sectional shape, a second tube offset from the first tube having an oval cross sectional shape larger than the first tube, and a third tube generally aligned with the first tube having an oval cross sectional shape about equal to the first tube contained in the interior space.

The flowpath assembly 332 may further include an enclosure 356 as shown in FIG. 5C. The enclosure 356 is formed around all flowpath tubes defining each of the flowpath channels 350, 352, 354. In other embodiments, the enclosure 356 may be formed around less than all of the flowpath tubes. In yet another embodiment, multiple enclosures may be formed around one or more subsets of the flowpath tubes. The enclosure 356 may be formed by hydroforming, mounting of fixing pieces together, wrapping the channels 334 or any other suitable method or system to provide the enclosure 356.

Figure 4D:
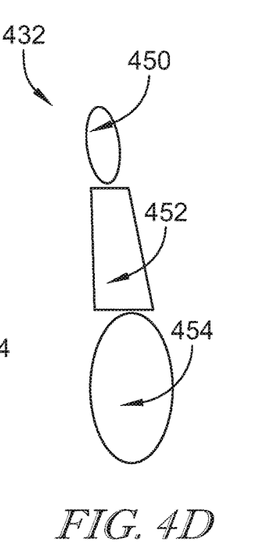
FIG. 4D is a diagrammatic view of a fourth embodiment of a flowpath assembly including a first tube having an oval cross sectional shape, a second tube having a polygonal cross sectional shape and a third tube having an oval shape, and showing that the tubes increase in size from top to bottom.

A fourth embodiment of a flowpath assembly 432 is shown in FIG. 4D. The flowpath assembly 432 defines a first flowpath channel 450, a second flowpath channel 452, and a third flowpath channel 454. The flowpath channels 450, 452, and 454 are offset vertically relative to one another and each include a different cross sectional shape and/or size. Specifically, the first channel 450 has an oval cross sectional shape, the second channel 452 has a polygonal cross sectional shape, and the third channel 454 has an oval cross sectional shape. Additionally, each of the flowpath channels have varying areas relative to one another.

Figure 5D:
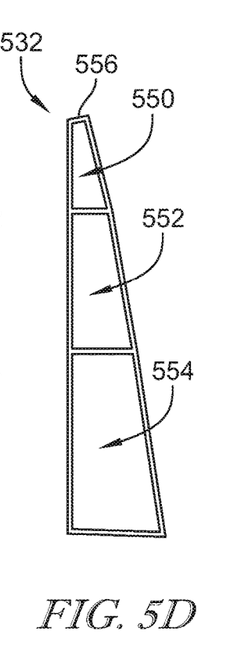
FIG. 5D is a diagrammatic view of an eighth embodiment of a flowpath assembly similar to FIG. 4D including a housing defining an interior space and a plurality of tubes each having a polygonal cross sectional shape contained in the interior space, and showing that the tubes increase in size from top to bottom.

A fifth embodiment of a flowpath assembly 532 similar to flowpath assembly 432 is shown in FIG. 5D. The flowpath assembly 532 defines a first flowpath channel 550, a second flowpath channel 552, and a third flowpath channel 554. The flowpath channels 550, 552, and 554 are offset vertically relative to one another and each has a polygonal cross sectional shape. Additionally, each of the flowpath channels have different areas relative to one another.

The flowpath assembly 532 may further include an enclosure 556 as shown in FIG. 5D. The enclosure 556 is formed around all flowpath tubes defining each of the flowpath channels 550, 552, 554. In other embodiments, the enclosure 556 may be formed around less than all of the flowpath tubes. In yet another embodiment, multiple enclosures may be formed around one or more subsets of the flowpath tubes. The enclosure 556 may be formed by hydroforming, mounting of fixing pieces together, wrapping the channels 534 or any other suitable method or system to provide the enclosure 556.

Figure 6A:
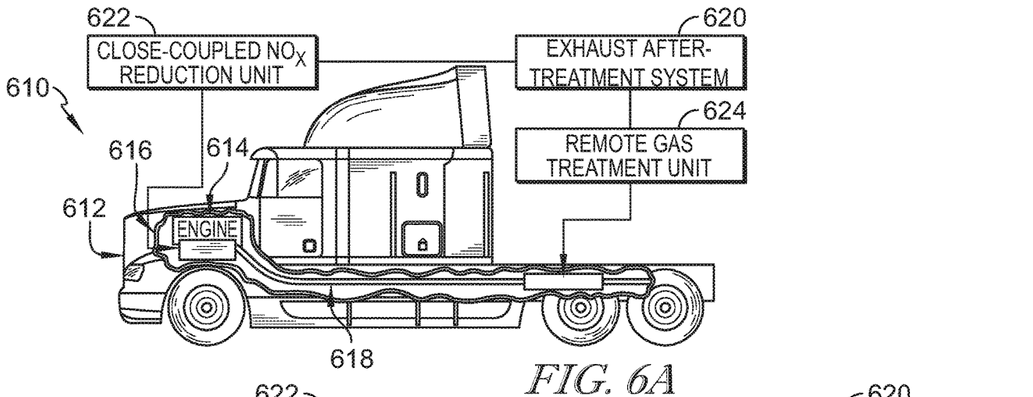
FIG. 6A is a side elevation and diagrammatic view of a second embodiment of an over the road vehicle with portions of a vehicle body cut away to expose an engine compartment diagrammatically showing a combustion engine located in the engine compartment along with a close-coupled $NO_x$ reduction unit that is used as part of an engine exhaust system to treat exhaust gases produced by the combustion engine.
Figure 6B:
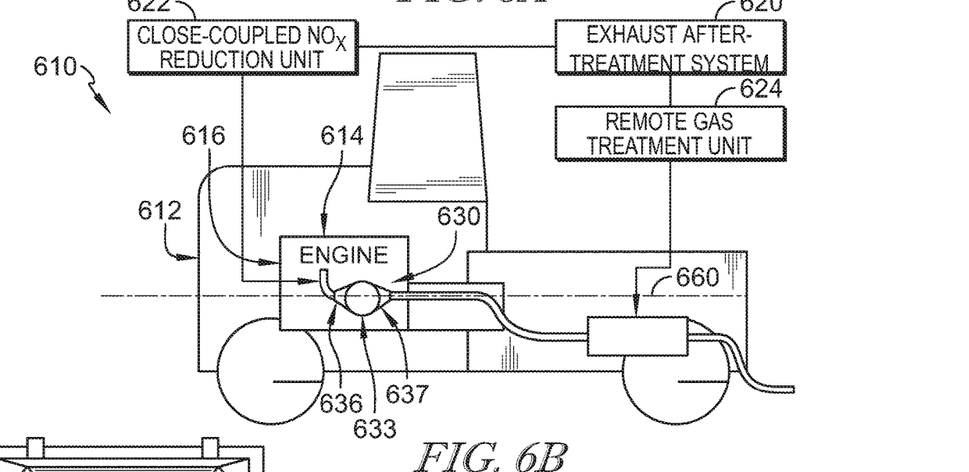
FIG. 6B is a diagrammatic view of the vehicle of FIG. 6A showing that the close-coupled NOx reduction unit is arranged generally perpendicular to a longitudinal axis of the vehicle.
Figure 7:
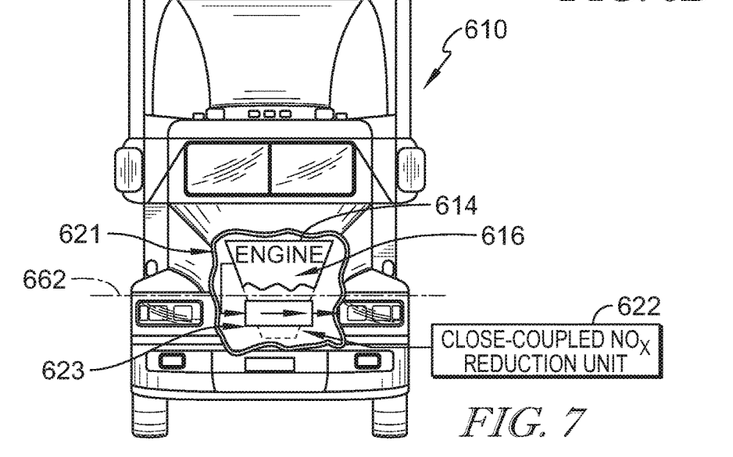
FIG. 7 is a front elevation view of the vehicle of FIGS. 6A and 6B showing that the close-coupled NOx reduction unit is coupled to the engine in the engine compartment and is arranged to extend widthwise relative to the vehicle and the engine from a first lateral side of the engine to a second lateral side of the engine.

A second embodiment of a vehicle 610 is shown in FIGS. 6A-7. The vehicle 610 is similar to vehicle 10. As such reference numbers to vehicle 10 in the 600 series are used to describe similar features included in the vehicle 610. The vehicle 610 includes a vehicle body 612 and a combustion engine 614. The vehicle body 612 defines an engine compartment 616 in which the combustion engine 614 is positioned. The combustion engine 614 produces exhaust gases that are directed though an exhaust passageway 618 and expelled into the atmosphere during operation of the combustion engine 614.

The vehicle 610 further includes an exhaust aftertreatment system 620 positioned along the exhaust passageway 618 in fluid commination with the combustion engine 14 as shown in FIGS. 6A and 6B. The exhaust aftertreatment system 620 is configured to treat the exhaust gases and remove effluents prior to the exhaust gases being expelled into the atmosphere. In the illustrative embodiment, the exhaust treatment system 620 includes a close-coupled NOx reduction unit 622 located in the engine compartment 616 and a remote gas treatment unit 624 arranged downstream of the combustion engine. The close-coupled NOx reduction unit 622 is positioned proximate to the combustion engine 612 to increase energy transferred to the close-coupled NOx reduction unit 622 during cold start operation of the combustion engine 612.

In particular, the close-coupled NOx reduction unit 622 is arranged to extend laterally along a widthwise axis 662 that extends from a first side of the vehicle 610 to a second side of the vehicle 610 as shown in FIG. 7. The close-coupled NOx reduction unit 622 includes the mixer 26, the doser 28, and the selective catalytic reduction unit (SCR) 30 described above with regards to vehicle 10.

The close-coupled NOx reduction unit 622 may further include a flowpath assembly 630 having an inlet 636, an outlet 637, and at least one flowpath tube 633 extending from the inlet 636 to the outlet 637 as shown in FIG. 6B. The inlet 636 is coupled directly to an exhaust outlet of the engine 614 or a turbocharger of the engine 614. In the illustrative embodiment, the inlet 636 and the outlet 637 are oriented parallel to a lengthwise axis 660 that extends from the front of the vehicle to the rear of the vehicle. The at least one flowpath tube 633 is oriented parallel to the widthwise axis 662.

The flowpath assembly 630 may include any number of flowpath tubes 633 defining respective flowpath channels. The flowpath channels may be sized and shaped like either of flowpath assemblies 32, 232, 332, 432, and 532 described above.

Like vehicle body 12, the vehicle body 612 includes an enclosure 621 that is shaped to define the engine compartment 616 and house the combustion engine 614 and the close-coupled NOx reduction unit 622 as shown diagrammatically in FIG. 7. Depending on the type of combustion engine 614 located in the engine compartment 616, differently sized spaces 623 may be formed between the combustion engine 614 and the enclosure 621. The close-coupled NOx reduction unit 622 may be located in a space formed behind the combustion engine 614. As such, the close-coupled NOx reduction unit 622 is arranged to lie in a footprint of the engine 614 when viewing the front of the vehicle 610 as shown in FIG. 7.

Figure 8:
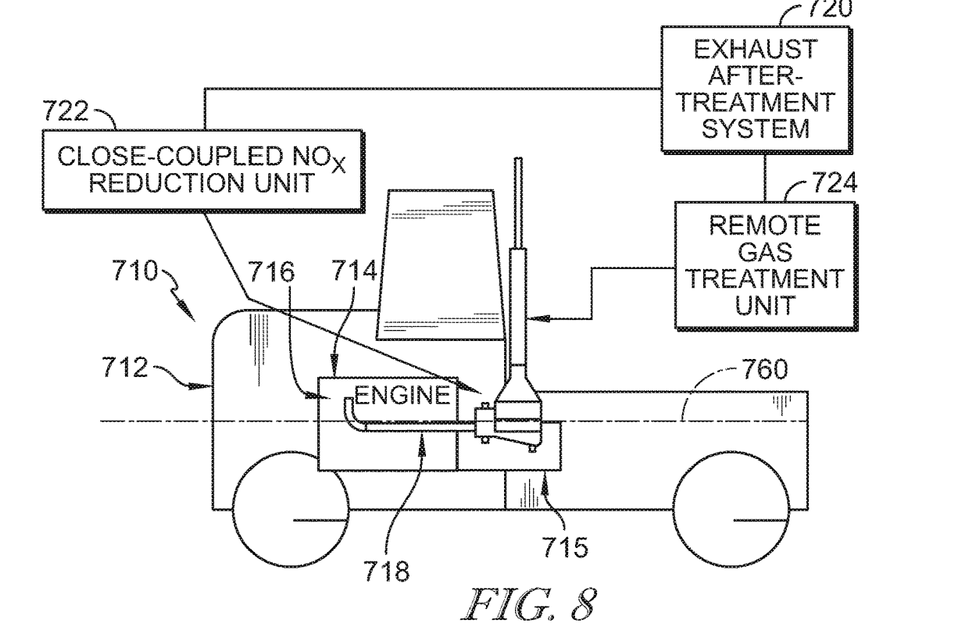
FIG. 8 is a diagrammatic view of a third embodiment of an over the road vehicle including a transmission and a combustion engine, and showing a close-coupled NOx reduction unit fluidly coupled to the engine and located proximate to the transmission.

A third embodiment of a vehicle 710 is shown in FIG. 8. The vehicle 710 is similar to vehicle 10. As such reference numbers corresponding to vehicle 10 in the 700 series are used to describe similar features included in the vehicle 710. The vehicle 710 includes a vehicle body 712, a combustion engine 714, and a transmission 715. The vehicle body 712 defines an engine compartment 716 in which the combustion engine 714 is positioned. The combustion engine 714 produces exhaust gases that are directed though an exhaust passageway 718 and expelled into the atmosphere during operation of the combustion engine 714.

The vehicle 710 further includes an exhaust aftertreatment system 720 positioned along the exhaust passageway 718 in fluid commination with the combustion engine 714 as shown in FIG. 8. In the illustrative embodiment, the exhaust treatment system 720 includes a close-coupled NOx reduction unit 722 and a remote gas treatment unit 724 arranged downstream of the combustion engine. The close-coupled NOx reduction unit 722 is positioned proximate to the engine 714 and the transmission 715 to increase energy transferred to the close-coupled NOx reduction unit 722 from the engine 714 during cold start operation.

Figure 9:
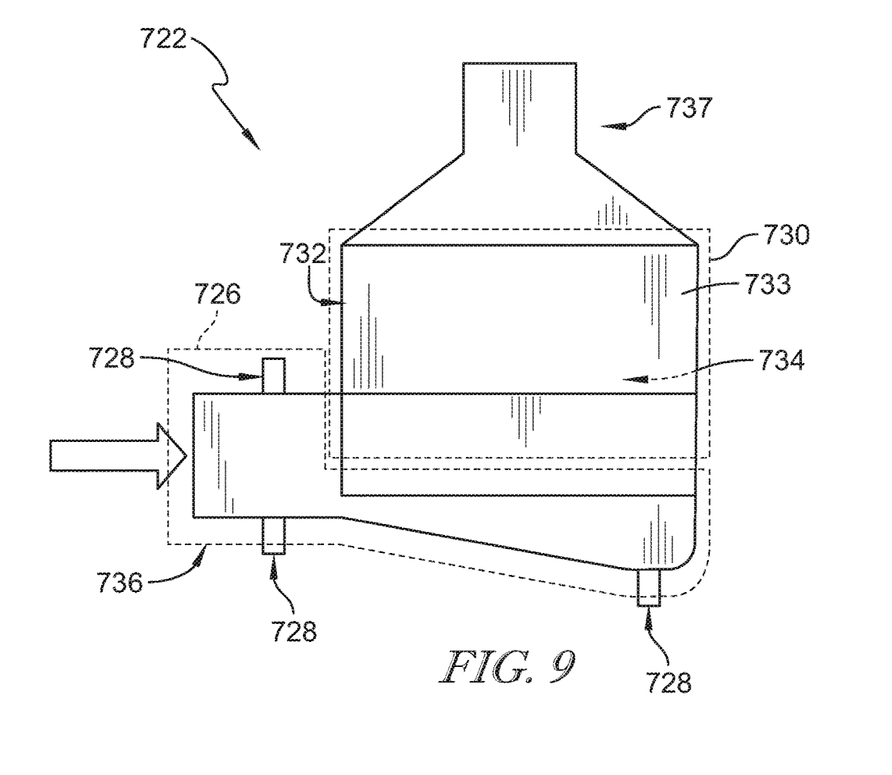
FIG. 9 is an enlarged side elevation view of the close-coupled NOx reduction unit of FIG. 8, the reduction unit including a mixer arranged to receive exhaust gases from the combustion engine, a doser configured to inject a reducing agent into the mixer, and a selective catalytic reduction unit housing a catalyst.

The close-coupled NOx reduction unit 722 includes a mixer 726, at least one doser 728 configured to inject a reducing agent into the mixer 726, and a selective catalytic reduction unit (SCR) 730 as shown in FIG. 9. The mixer 726 is coupled to the exhaust passageway 718 and is configured to mix the exhaust gases and the reducing agent together. Illustratively, a plurality of dosers 728 may be coupled to the mixer 726 to provide multiple injection points for the reducing agent to increase mixing of the exhaust gases and the reducing agent. The SCR 730 includes an SCR catalyst that is configured to chemically react with the exhaust gases and the reducing agent to reduce nitrous oxides in the exhaust gases.

The remote gas treatment unit 724 is coupled to the outlet 737 and extends upwardly away from the close coupled NOx reduction unit 722 as shown in FIG. 8. The remote gas treatment unit 724 includes a plurality of additional exhaust gas treatment devices such as a diesel oxidation catalyst (DOC), a diesel particulate filter (DPF), and a secondary NOx reduction unit. The secondary NOx reduction unit includes at least one secondary doser and at least one secondary selective catalytic reduction unit (SCR). The secondary doser is configured to inject additional reducing agent into the secondary NOx reduction unit where the exhaust gases and the additional reducing agent are mixed together. The secondary SCR includes a secondary catalyst that encourages chemical reaction between exhaust gases and the reducing agent.

The SCR 730 includes a flowpath assembly 732 that includes at least one flowpath tube 733 defining a flowpath channel 734, an inlet 736, and an outlet 737 as shown in FIG. 9. The at least one tube houses the SCR catalyst. The inlet 736 is arranged generally parallel to a lengthwise axis 760 of the vehicle 710 that extends from a front of the vehicle to a rear of the vehicle. The outlet 737 is arranged generally perpendicular to the lengthwise axis 760 and extends upwardly from the mixer 726.

Figure 10:
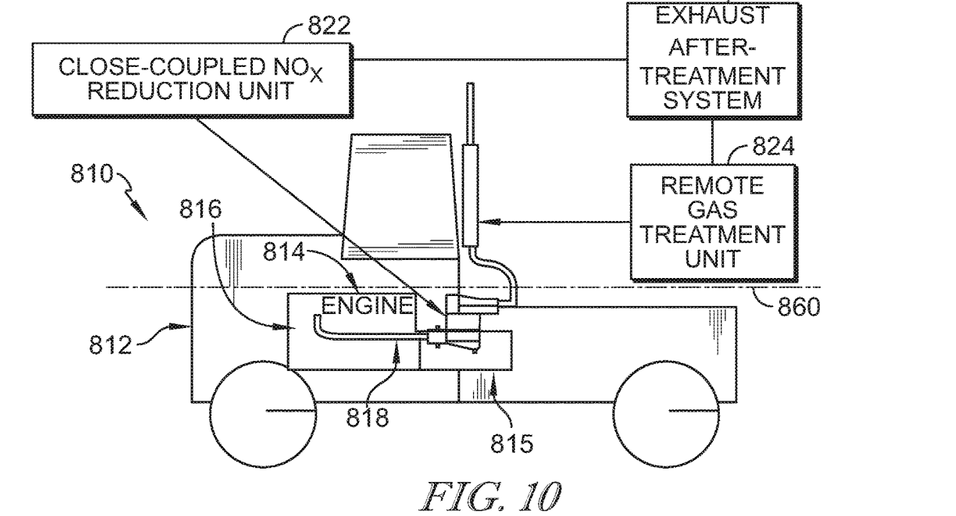
FIG. 10 is a diagrammatic view of a fourth embodiment of an over the road vehicle including a transmission and a combustion engine, and showing a close-coupled NOx reduction unit fluidly coupled to the engine and located proximate to the transmission.

A fourth embodiment of a vehicle 810 is shown in FIG. 10. The vehicle 810 is similar to vehicle 10. As such reference numbers corresponding to vehicle 10 in the 800 series are used to describe similar features included in the vehicle 810. The vehicle 810 includes a vehicle body 812, a combustion engine 814, and a transmission 815. The vehicle body 812 defines an engine compartment 816 in which the combustion engine 814 is positioned. The combustion engine 814 produces exhaust gases that are directed though an exhaust passageway 818 and expelled into the atmosphere during operation of the combustion engine 814.

The vehicle 810 further includes an exhaust aftertreatment system 820 positioned along the exhaust passageway 818 in fluid commination with the combustion engine 814 as shown in FIG. 10. In the illustrative embodiment, the exhaust treatment system 820 includes a close-coupled NOx reduction unit 822 and a remote gas treatment unit 824 arranged downstream of the combustion engine. The close-coupled NOx reduction unit 822 is positioned proximate to the engine 814 and the transmission 815 to increase energy transferred to the close-coupled NOx reduction unit 822 from the engine 814 during cold start operation.

Figures 11, 12:
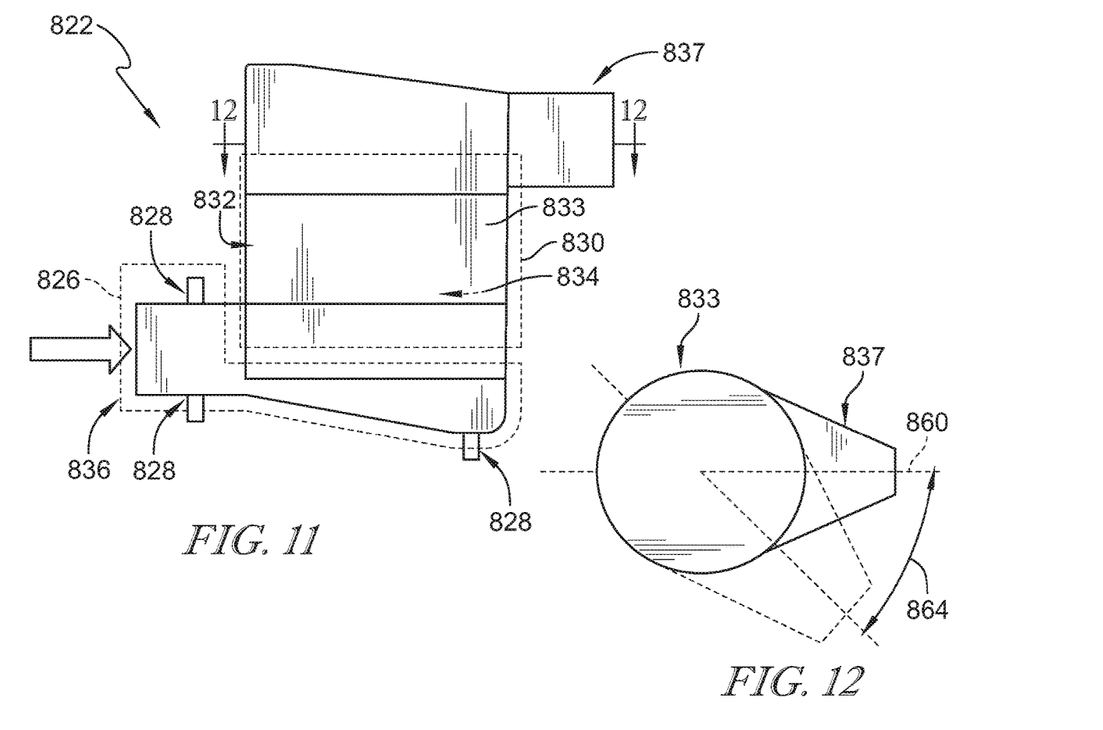
FIG. 11 is an enlarged side elevation view of the close-coupled NOx reduction unit of FIG. 10, the reduction unit including a mixer arranged to receive exhaust gases from the combustion engine, a doser configured to inject a reducing agent into the mixer, and a selective catalytic reduction unit housing a catalyst.
FIG. 12 is a cross sectional view taken along 12-12 in FIG. 11 showing that the reduction unit further includes an outlet that may be oriented at a variety of angles relative to the mixer.

The close-coupled NOx reduction unit 822 includes a mixer 826, at least one doser 828 configured to inject a reducing agent into the mixer 826, and a selective catalytic reduction unit (SCR) 830 as shown in FIG. 11. The mixer 826 is coupled to the exhaust passageway 818 and is configured to mix the exhaust gases and the reducing agent together. Illustratively, a plurality of dosers 828 may be coupled to the mixer 826 to provide multiple injection points for the reducing agent to increase mixing of the exhaust gases and the reducing agent. The SCR 830 includes an SCR catalyst that is configured to chemically react with the exhaust gases and the reducing agent to reduce nitrous oxides in the exhaust gases.

The remote gas treatment unit 824 is coupled to the outlet 837 and extends upwardly away from the close coupled NOx reduction unit 822 as shown in FIG. 11. The remote gas treatment unit 824 includes a plurality of additional exhaust gas treatment devices such as a diesel oxidation catalyst (DOC), a diesel particulate filter (DPF), and a secondary NOx reduction unit. The secondary NOx reduction unit includes at least one secondary doser and at least one secondary selective catalytic reduction unit (SCR). The secondary doser is configured to inject additional reducing agent into the secondary NOx reduction unit where the exhaust gases and the additional reducing agent are mixed together. The secondary SCR includes a secondary catalyst that encourages chemical reaction between exhaust gases and the reducing agent.

The SCR 830 includes a flowpath assembly 832 that includes at least one flowpath tube 833 defining a flowpath channel 834, an inlet 836, and an outlet 837 as shown in FIG. 11. The at least one tube houses the SCR catalyst. The inlet 836 is arranged generally parallel to a lengthwise axis 860 of the vehicle 810 that extends from a front of the vehicle to a rear of the vehicle. The outlet 837 is also arranged generally parallel to the lengthwise axis 860 but is offset vertically from the inlet 836. However, in other embodiments, the outlet 837 may be oriented at any non-zero angle 864 from the axis 860 as suggested in FIG. 12.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An over the road vehicle comprising:
a vehicle body defining an engine compartment,
a combustion engine mounted in the engine compartment, and
a vehicle exhaust system including a close coupled NOx reduction unit fluidly coupled to the combustion engine to receive exhaust gases discharged from the combustion engine, the close coupled NOx reduction unit including a mixer coupled to receive exhaust gases from the combustion engine, a doser configured to inject reducing agent into the mixer so as to induce mixing of the exhaust gases with reducing agent in the mixer, and a selective catalytic reduction unit housing a catalyst that encourages chemical reaction between the exhaust gases and the reducing agent so as to reduce the amount of NOx in the exhaust gases,
wherein the close-coupled NOx reduction unit is mounted in the engine compartment with the combustion engine so that energy in the exhaust gases is not dissipated during transport of the exhaust gases out of the engine compartment before the exhaust gases chemically react with the reducing agent and the catalyst thereby further encouraging chemical reaction, and
wherein the vehicle exhaust system includes a remote gas treatment unit fluidly coupled to the close-coupled NOx reduction unit to receive exhaust gases from the close coupled NOx reduction unit, the remote gas treatment unit includes a particulate filter, and the remote gas treatment unit is located outside the engine compartment.

2. The vehicle of claim 1, wherein the remote gas treatment unit includes a secondary NOx reduction unit having a secondary doser configured to inject reducing agent into the exhaust gases and a secondary catalyst that encourages chemical reaction between exhaust gases and the reducing agent in the secondary NOx reduction unit so as to reduce the amount of NOx in the exhaust gases.

3. The vehicle of claim 1, wherein the selective catalytic reduction unit includes a flowpath assembly that defines a plurality of flowpath channels in which the catalyst is mounted.

4. The vehicle of claim 3, wherein the plurality of flowpath channels are co-linear.

5. The vehicle of claim 3, wherein at least one of the plurality of flowpath channels has a different cross-sectional shape when viewed along the direction of flow than the other flowpath channels.

6. The vehicle of claim 3, wherein the flowpath assembly includes an inlet fluidly coupled to each of the plurality of flowpath channels, and the inlet includes an insulated or air gap pipe.

7. The vehicle of claim 3, wherein the flowpath assembly includes an inlet fluidly coupled to each of the plurality of flowpath channels and a restrictor plate mounted downstream of the inlet while also upstream of the flowpath channels.

8. The vehicle of claim 3, wherein the selective catalytic reduction unit includes a plurality of tubes that define the plurality of flowpath channels and an enclosure that houses the tubes.

9. The vehicle of claim 8, wherein the enclosure comprises metallic foam materials.

10. An over the road vehicle comprising
a vehicle body including an engine compartment,
a combustion engine mounted in the engine compartment, and
a vehicle exhaust system including a close coupled NOx reduction unit fluidly coupled to the combustion engine to receive exhaust gases discharged from the combustion engine, the close coupled NOx reduction unit including a mixer arranged to receive exhaust gases from the combustion engine, a doser configured to inject reducing agent into the mixer so as to induce mixing of the exhaust gases with reducing agent in the mixer, and a selective catalytic reduction unit housing a catalyst that encourages chemical reaction between the exhaust gases and the reducing agent so as to reduce the amount of NOx in the exhaust gases,
wherein the closed-coupled NOx reduction unit is arranged to axially overlap with the combustion engine along a lengthwise axis of the vehicle that extends from a front of the vehicle to a rear of the vehicle so that temperature of the exhaust gases is not dissipated during excess transport of the exhaust gases along the lengthwise axis away from the combustion engine before the exhaust gases chemically react with the reducing agent and catalyst thereby further encouraging chemical reaction, and
wherein the vehicle exhaust system includes a remote gas treatment unit fluidly coupled to the close-coupled NOx reduction unit to receive exhaust gases from the close coupled NOx reduction unit, the remote gas treatment unit includes a particulate filter, and the remote gas treatment unit is located outside the engine compartment.

11. The vehicle of claim 10, wherein at least a portion of the close-coupled NOx reduction unit is located within a footprint of the combustion engine when the vehicle is viewed in side elevation.

12. The vehicle of claim 11, wherein the primary direction of exhaust gas flow through the selective catalytic reduction unit is parallel to the lengthwise axis of the vehicle.

13. The vehicle of claim 11, wherein the primary direction of exhaust gas flow through the selective catalytic reduction unit is perpendicular to the lengthwise axis of the vehicle and parallel to a widthwise axis that extends side-to-side across the vehicle.

14. An over the road vehicle comprising:
a vehicle body defining an engine compartment,
a combustion engine mounted in the engine compartment, and
a vehicle exhaust system including a close coupled NOx reduction unit mounted in the engine compartment with the combustion engine and a remote gas treatment unit located outside the engine compartment,
wherein the close coupled NOx reduction unit is fluidly coupled to the combustion engine and includes a mixer configured to receive exhaust gases from the combustion engine and a doser configured to inject reducing agent into the mixer so as to induce mixing of the exhaust gases with reducing agent in the mixer,
wherein the remote gas treatment unit is fluidly coupled to the close-coupled NOx reduction unit to receive exhaust gases from the close coupled NOx reduction unit, and the remote gas treatment unit includes at least one of a particulate filter and a secondary NOx reduction unit, the secondary NOx reduction unit having a secondary doser configured to inject reducing agent into the exhaust gases and a secondary catalyst that encourages chemical reaction between exhaust gases and the reducing agent in the secondary NOx reduction unit so as to reduce the amount of NOx in the exhaust gases.

15. The vehicle of claim 14, wherein the remote gas treatment unit includes both the particulate filter and the secondary NOx reduction unit located outside the engine compartment.

16. The vehicle of claim 15, wherein the close coupled NOx reduction unit includes a selective catalytic reduction unit housing a catalyst that encourages chemical reaction between the exhaust gases and the reducing agent so as to reduce the amount of NOx in the exhaust gases.

17. The vehicle of claim 14, wherein at least a portion of the close-coupled NOx reduction unit is located within a footprint of the combustion engine when the vehicle is viewed in side elevation.

18. The vehicle of claim 17, wherein all of the close-coupled NOx reduction unit is located within a footprint of the combustion engine when the vehicle is viewed in side elevation.

19. The vehicle of claim 14, wherein at least a portion of the close-coupled NOx reduction unit is located within a footprint of the combustion engine when the vehicle is viewed in front elevation.

20. The vehicle of claim 19, wherein a majority of the close-coupled NOx reduction unit is located within a footprint of the combustion engine when the vehicle is viewed in front elevation.

* * * * *